United States Patent [19]

Arnold

[11] 4,218,160
[45] Aug. 19, 1980

[54] HEAVY DUTY CUTTING INSERT

[75] Inventor: Leonard R. Arnold, Highland Park, Ill.

[73] Assignee: Fansteel Inc., North Chicago, Ill.

[21] Appl. No.: 942,551

[22] Filed: Sep. 15, 1978

[51] Int. Cl.² .............................................. B26D 1/00
[52] U.S. Cl. .................................................... 407/114
[58] Field of Search ................................ 407/113, 114

[56] References Cited

U.S. PATENT DOCUMENTS

| | | | |
|---|---|---|---|
| 3,137,917 | 6/1964 | Dowd | 407/114 |
| 3,381,349 | 5/1968 | Newcomer | 407/114 |
| 3,792,515 | 2/1974 | Lundgren | 407/113 |
| 3,882,580 | 5/1975 | Lundgren | 407/114 |
| 3,968,550 | 7/1976 | Gehri | 407/114 |
| 4,056,871 | 11/1977 | Bator | 407/114 |

Primary Examiner—Leonidas Vlachos
Attorney, Agent, or Firm—Barnes, Kisselle, Raisch & Choate

[57] ABSTRACT

A heavy duty, indexable insert for use in single-point and multiple-point negative rake holding devices, which includes a polygonal body having conjunctive sides providing cutting edges bounding a flat, narrow, downwardly inclined land which drops off sharply into a wide pocket which inclines at a very low angle to the center or axis of the insert and also narrows in width from the corners of a particular edge to center.

4 Claims, 5 Drawing Figures

U.S. Patent     Aug. 19, 1980     4,218,160
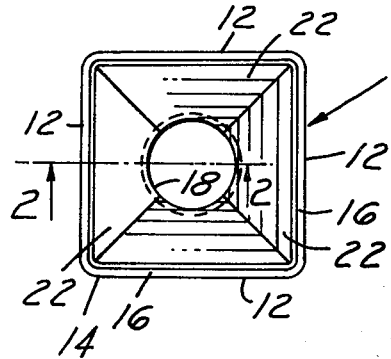
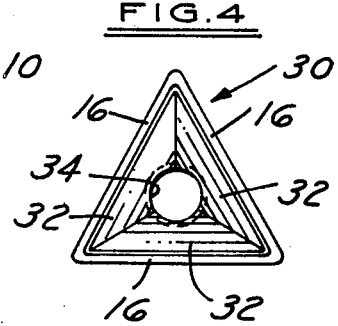
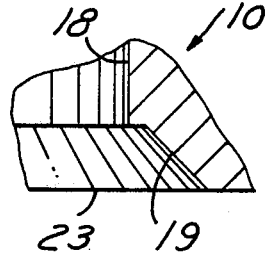
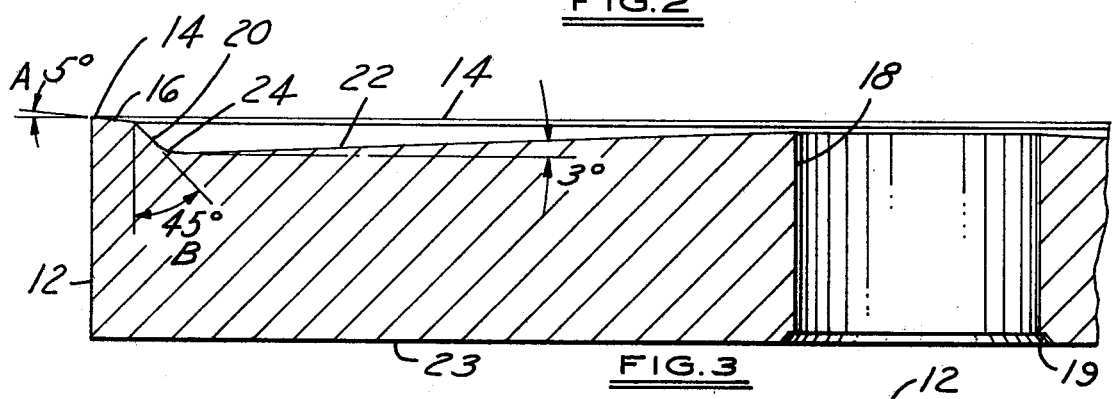
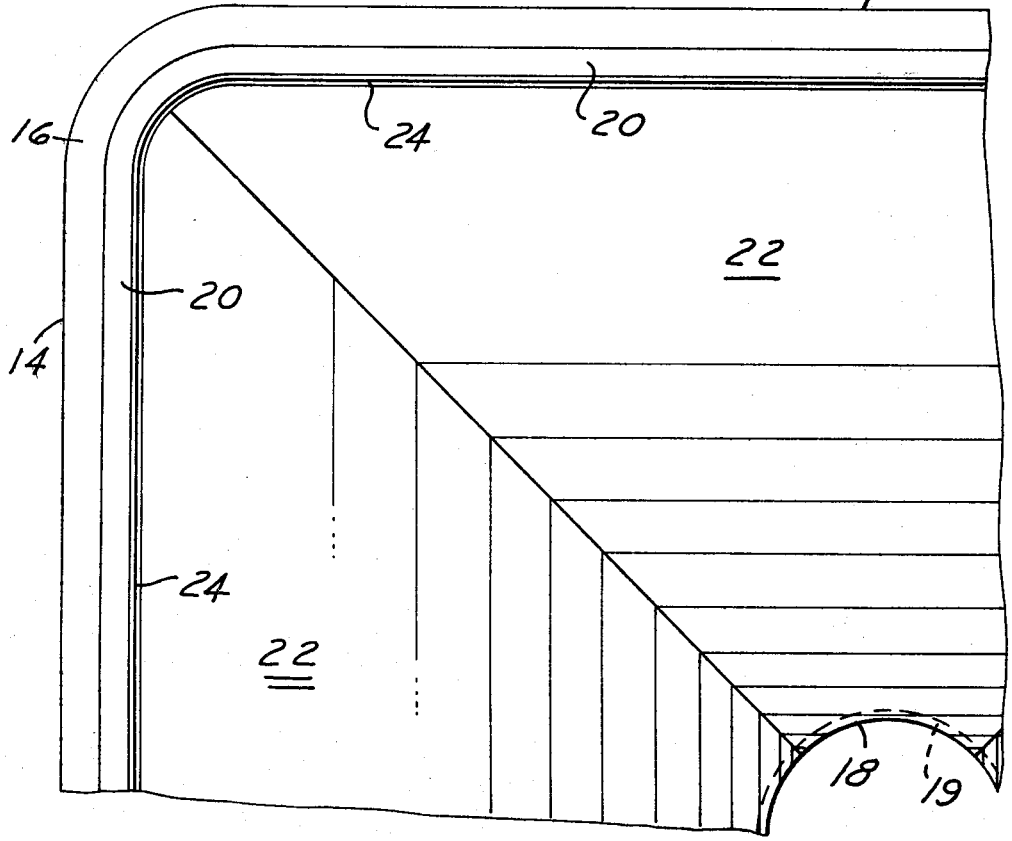

HEAVY DUTY CUTTING INSERT

FIELD OF INVENTION

Disposable hard metal, indexable inserts for single-point and multiple-point negative rake holding devices having receiving recesses to fit and clamping means to retain the inserts.

BACKGROUND OF THE INVENTION

For some years, beginning prior to World War II and with increasing volume, the metal cutting industry has been using toolholders with hard metal inserts to contact the work. Early on the hard metal, in the form of tungsten carbide, was brazed onto a steel shank. Many different grades of carbide have been developed. One departure from the brazed-on tip was the use of a mechanical toolholder which would hold a slug type of insert, that is, an insert square, triangular or round in cross-section in a range of $\frac{1}{4}''$ to $\frac{3}{4}''$ in thickness and having a length of $1\frac{1}{2}$ to 2" or more. This type of insert was held more or less vertically with proper clearance rake angles at the front of a mechanical toolholder and was intended to be backed by a back-up screw and fed upwardly by that screw as the insert was worn and reground to sharpness.

The next phase of development produced the so-called throwaway inserts (TA) which were in the form of small flat pellets of tungsten carbide. Toolholders were fashioned with a small pocket at one corner with a flat support wall and back-up side walls leaving a corner open to expose a retained insert to the work. Various top clamps and pin-type retaining devices were utilized to secure the small inserts securely in the holders.

As a refinement on these inserts, so-called chip control grooves were ground into the top surfaces spaced inwardly from the cutting edge to provide chip control of the cut metal. This involved curling the removed metal in a way to avoid long entangled strips of metal. Preferably, the chips were curled in the form of a helix and broken off in lengths which would drop away from the work. Later these chips control grooves were pressed into the green tungsten carbide inserts prior to the heat treatment, called sintering, which consolidated the tungsten carbide for final use. This enabled more complex configurations to be formed in the face of the inserts.

An example of one of the early inserts is shown in the U.S. Pat. to Dowd, No. 3,137,917. More recent examples are illustrated in U.S. Pat. Nos. 3,792,515; 3,875,663; and 3,973,307. The latter patent shows a raised, peripheral land extending around the insert and a drop-off from this land to a flat and lower surface which occupies the central portion of the insert.

It will be appreciated that there are many variables in a cutting operation quite apart from the material being cut. These include the depth of cut, the rotational speed in lathe cutting, for example, and the feed rate.

THE PRESENT INVENTION

This disclosure of the present invention relates to an insert designed for heavy duty cutting with the objects of lowering power consumption and providing a more evenly started and broken chip. Reduced variations in both the radial force and feed forces are an object as the chip starts to form and then breaks. In addition, there is an object to provide much less variation in the tangential forces. A further object is to provide a stronger insert.

Briefly, these objects for a heavy duty insert are accomplished by an insert with an edge land slanted in a downward plane from the edge to provide what may be called a neutral rake in a 5° negative cutter, for example. The land drops away sharply from its inner edge to the base of a flat plane which inclines upwardly at a very low angle such as 1° to 5°, depending on the size of the insert and, in inclining upwardly, the plane narrows toward the center of the insert. A low angle is used with large inserts, and a higher angle with small inserts.

Other objects and features of the invention will be apparent in the following description and claims directed to the details of a preferred embodiment.

DRAWINGS accompany the disclosure, and the various views thereof may be briefly described as:

FIG. 1, a plan view of a square insert constructed in accordance with the present invention.

FIG. 2, a sectional view on line 2—2 of FIG. 1.

FIG. 3, an enlarged plan view of one corner of a square insert.

FIG. 4, a view of a triangular insert constructed in accordance with the invention.

FIG. 5, an enlarged view of a section of the bottom of the hole in an insert.

DETAILED DESCRIPTION

With reference to the drawings, in FIG. 1, a square insert 10 is illustrated to be formed of a suitably selected grade of tungsten carbide known in the art. Other polygonal shapes might be used such as triangular, hexagonal and so forth.

Side walls 12, conjunctive and radiused at the corners, lie in intersecting planes which are parallel to the axis of the insert 10 and perpendicular to a plane containing the top edges 14, each side wall terminating at its top edge in the cutting edge 14 which is formed by the side walls and a flat land 16 which is defined by a flat plane which angles from edge 14 downwardly at an angle of 5° to 15°. As an example, a 5° angle is illustrated in FIG. 2. When used in a toolholder that has a 5° composite negative rake, an insert with a 5° decline in the land plane 16 presents a neutral side rake and negative back rake to the work being machined, thus creating a shearing action to produce the chip during the cutting. As another example, by using a greater angle of descent for land plane 16, a positive side rake and negative back rake is presented to the work when the insert is used in the above-described toolholder with a 5° composite negative rake.

The width of the land plane 16 will vary with the size of the insert and the feed rate to be employed. A large insert is normally associated with heavier metal cutting and greater feed rates than small inserts. As an example, a $\frac{3}{4}''$ square insert is preferably provided with a land of 0.025".

The insert 10 has a central hole 18, which is used in either: a pin-type holder (not shown), that has a pin in the holder which projects into the opening and which can be moved to force the insert against the backing walls (insert pocket walls) in the holder; or in a combination toolholder that utilizes both a pin (as described) and also a top clamp for forcing the insert down on the seat as the method of holding the insert in the pocket.

Hole 18 may incorporate a countersink 19 at the lower base 23 of the insert to minimize chipping or breaking of the insert.

The surface 20 of the insert inside the land 16 drops sharply at about 30° to 55° and, in the example shown, at 45°. It then is radiused at 24 to blend with the inner surface 22 of the insert which rises in a flat plane to hole 18 in the insert. The angle of rise of the surfaces 22 is about 3° in the example shown, and will always be a very low angle in the range of about 1° to 5° for other inserts. Each inclining surface 22 narrows as it rises to the center of the insert so, in essence, a low angle pyramid is formed inside the lands 16 and the drop-off surfaces 20. The inclined surfaces 22 intersect and terminate at hole 18 slightly below the plane created by cutting edge 14. The surface 22 serves in heavy feed cutting to contact and curl the chip enough to provide sufficient curl and frequent enough chip breakage that cutting can be performed advantageously.

A triangular insert 30 is shown in FIG. 4, constructed in accordance with the invention. A three-sided pyramid within the land 16 has planes 32 rising to the center hole 34. Other multiple side units can also be utilized such as pentagons or hexagons.

The hole 18 of FIGS. 1 to 3 and the hole 34 of FIG. 4 preferably has a peripheral edge at the bottom plane of the insert which is relieved as shown in FIG. 5 with a small counterbore 19 and radius to reduce corner stress at this point.

The pyramid construction provides an insert of improved strength over heavy duty inserts of the prior art.

The inserts of this invention provide efficient metal cutting over a broad range of insert sizes, and are particularly effective in medium to heavy feed cutting applications.

The following results show the average tangential, feed and radial forces in pounds used to cut A.I.S.I. 8620 steel 5.7" in diameter at 224 R.P.M., 334 SFPM (surface feet per minute), 0.048 IPR (inches per revolution) and 0.250 DOC (depth of cut) using an insert of this invention:

Tangential force—2850 lb.
Feed force—1960 lb.
Radial force—870 lb.

Thus, the heavy duty insert with a sturdy land construction provides excellent cutting chracteristics in a relatively simple insert construction which can be readily shaped in pressing prior to sintering. The die formations are correspondingly simple, thus insuring low cost and low rejection in the formation process.

I claim:

1. An indexable throwaway insert formed of hard material for heavy duty cutting comprising a polygonal body having conjunctive sides lying in planes parallel to the axis of the body and defined by upper and lower peripheral edges lying in parallel planes perpendicular to said axis, each upper peripheral edge forming the outer boundary at a sharp junction of a narrow land extending inwardly and downwardly from the edge at a relatively low angle, a secondary surface extending around the periphery of said body joining conjunctively with the inner edge of said land and dropping sharply downward from said land at an angle of 30° to 55° and a central surface within said secondary surface in the form of a low angle, flat-sided pyramid rising from each side of the polygonal body substantially to but below the level of the plane of said edges at the center of the body, said central surface rising from the lowest point of the secondary surface in the direction of the center of the insert at an angle ranging from 1° to 5°.

2. An insert according to claim 1 in which said narrow land extends inwardly and downwardly from said edge at an angle of 5° to 15°.

3. An insert according to claim 1, which, when used in a toolholder having a 5° composite negative rake, presents a neutral side rake and negative back rake to the work, creating a shearing action to produce a chip.

4. An insert according to claim 3 having a narrow land extending inwardly and downwardly from the edge at an angle of 5° to 15°, said insert, when used in a toolholder having a 5° or greater composite negative rake, presents a positive side rake and negative back rake.

* * * * *